(12) United States Patent
Baillargeon (10) Patent No.: US 9,326,182 B2
(45) Date of Patent: Apr. 26, 2016

(54) METHOD AND SYSTEM FOR RADIO SERVICE OPTIMIZATION USING ACTIVE PROBING OVER TRANSPORT NETWORKS

(71) Applicant: Telefonaktiebolaget L M Ericsson (publ), Stockholm (SE)

(72) Inventor: Steve Baillargeon, Gatineau (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 115 days.

(21) Appl. No.: 14/042,766

(22) Filed: Oct. 1, 2013

(65) Prior Publication Data

US 2014/0092736 A1    Apr. 3, 2014

Related U.S. Application Data

(60) Provisional application No. 61/708,757, filed on Oct. 2, 2012.

(51) Int. Cl.
*H04W 4/00* (2009.01)
*H04W 28/02* (2009.01)
(Continued)

(52) U.S. Cl.
CPC ........... *H04W 28/0236* (2013.01); *H04L 43/08* (2013.01); *H04L 43/50* (2013.01); *H04W 24/06* (2013.01); *H04W 72/1226* (2013.01); *H04W 92/12* (2013.01); *H04L 43/087* (2013.01); *H04L 43/0852* (2013.01); *H04L 43/0858* (2013.01); *H04L 43/0882* (2013.01); *H04W 28/12* (2013.01); *H04W 92/045* (2013.01)

(58) Field of Classification Search
USPC .......... 370/395.21, 230, 252; 455/422.1, 423, 455/453, 560
See application file for complete search history.

(56) References Cited

U.S. PATENT DOCUMENTS 7,068,607 B2    6/2006 Partain et al.
7,778,179 B2    8/2010 Ekelin et al.
(Continued)

FOREIGN PATENT DOCUMENTS

WO    2008041929 A2    4/2008

OTHER PUBLICATIONS

Written Opinion of the International Prelimiary Examining Authority dated Oct. 10, 2014 for International Application No. PCT/IB2013/059041, International Filing Date: Oct. 1, 2013 consisting of 4-pages.
(Continued)

*Primary Examiner* — Phuongchau Ba Nguyen
(74) *Attorney, Agent, or Firm* — Christopher & Weisberg, P.A.

(57) ABSTRACT

A method and system for determining quality and capacity of a transport monitoring connection between radio service nodes to facilitate local management of subscriber connections are disclosed. One method includes sending first test packets from a first radio service node to a second radio service node via the transport monitoring connection. Second test packets are received from the second radio service node. The second test packets have information added to the first test packets by the second radio service node. The second test packets are analyzed to determine a quality and a bandwidth of the transport monitoring connection. Control and user plane functions are informed when transport monitoring performance is one of degraded and improved based on the quality and bandwidth. The method includes making radio service provisioning decisions based on the quality and bandwidth of the transport monitoring connection.

10 Claims, 6 Drawing Sheets

(51) Int. Cl.
- H04W 92/12 (2009.01)
- H04W 24/06 (2009.01)
- H04W 72/12 (2009.01)
- H04L 12/26 (2006.01)
- H04W 28/12 (2009.01)
- H04W 92/04 (2009.01)

(56) References Cited

U.S. PATENT DOCUMENTS

| | | | |
|---|---|---|---|
| 8,755,405 B2 * | 6/2014 | Kovvali et al. | 370/468 |
| 2004/0133391 A1 | 7/2004 | Bovo et al. | |
| 2007/0153695 A1 | 7/2007 | Gholmieh et al. | |
| 2007/0275760 A1 * | 11/2007 | Lundh et al. | 455/560 |
| 2010/0216451 A1 * | 8/2010 | De Pasquale et al. | 455/423 |
| 2012/0128000 A1 | 5/2012 | Baillargeon et al. | |

OTHER PUBLICATIONS

K. Ramakrishnan et al.—Network Working Group, Request for Comments: 3168: Updates: 2474, 2401, 793, Obsoletes: 2481, Category: Standards Track, "The Addition of Explicit Congestion Notification (ECN) to IP" Sep. 1, 2010 (63-pages).

K. Hedayat et al—Network Working Group, Request for Comments: 5357: Category: Standards Track, "A Two-Way Active Measurement Protocol (TWAMP)" Oct. 1, 2008 (26-pages).

P. Chimento et al.—Network Working Group, Request for Comments: 5136: Category: Informational, "Defining Network Capacity" Feb. 1, 2008 (14-pages).

B. Briscoe et al.—Internet Engineering Task Force (IETF), Request for Comments: 6789: Category: Informational, ISSN: 2070-1721, "Congestion Exposure (ConEx) Concepts and Use Cases" Dec. 1, 2012 (17-pages).

S. Baillargeon et al.—Internet Engineering Task Force (IETF), Request for Comments: 6802: Category: Informational, ISSN: 2070-1721, "Ericsson Two-Way Active Measurement Protocol (TWAMP) Value-Added Octets" Nov. 1, 2012 (16-pages).

3GPP TS 23.401 V12.1.0 (Jun. 2013), 3rd Generation Partnership Project; Technical Specification Group Services and System Aspects; General Packet Radio Service (GPRS) enhancements for Evolved Universal Terrestrial Radio Access Network (E-UTRAN) access (Release 12) Jun. 2013 consisting of 291-pages.

International Search Report and Written Opinion dated Feb. 5, 2014 for International Application No. PCT/IB2013/059041, International Filing Date: Oct. 1, 2013 consisting of 14-pages.

3GPP TSG-RAN WG3 Meeting #61 R3-082224, Jeju, South Korea, Aug. 18-Aug. 22, 2008, Title: S1-U TNL Congestion Indication, Source: T-Mobile, Orange, Agenda Item: 10.1.4, Document for Approval consisting of 3-pages.

International Preliminary Report on Patentability Examining Authority dated Jan. 16, 2015 for International Application No. PCT/IB2013/059041, International Filing Date: Oct. 1, 2013 consisting of 25-pages.

* cited by examiner

METHOD AND SYSTEM FOR RADIO SERVICE OPTIMIZATION USING ACTIVE PROBING OVER TRANSPORT NETWORKS

CROSS REFERENCE TO RELATED APPLICATION

This Application is related to claims priority to U.S. Provisional Patent Application No. 61/708,757, entitled, METHOD AND SYSTEM FOR RADIO SERVICE OPTIMIZATION USING ACTIVE PROBING OVER TRANSPORT NETWORKS, filed Oct. 2, 2012, the entire contents of which is incorporated herein by reference.

TECHNICAL FIELD

The present invention relates to radio service optimization based on the estimation of transport path quality and capacity by each radio access node.

BACKGROUND

Transport networks are considered scarce shared resources and bandwidth demand is difficult to predict and manage. With the deployment of Wireless Fidelity (Wi-Fi), third generation (3G) and fourth generation (4G) radio access networks, the mobile transport network, i.e., the backhaul packet network, is becoming the bandwidth bottleneck (BB), which is defined as the lowest bandwidth along the complete path between the mobile subscriber and the service endpoint, e.g., the Internet. With long term evolution (LTE) networks, the requested Guaranteed Bit Rate (GBR) for a subscriber GBR connection or the requested Aggregate Maximum Bit Rate (AMBR) for the subscriber Non-GBR connections will soon surpass 300 Mbps, thus making it possible for a single subscriber to consume a large portion or all of the transport network resources available between a radio access node and a mobile core network.

Furthermore, coordination capabilities between distributed radio access nodes are needed to improve the user packet delivery due to interference caused by the densification of the radio network (larger number of small and larger radio access nodes in a given geographical area). Such radio coordination capabilities do not perform well (or not at all) if the transport delay between radio access nodes is large relative to a threshold value or if the available capacity between the radio access nodes is small relative to a threshold value.

Current radio access technologies, such as Wi-Fi, 3G or 4G, do not dynamically account for the variable quality (packet delay and loss) and available capacity of the mobile transport network when admitting a new subscriber on a radio access node, delivering or scheduling user packets to mobile subscriber devices, or when managing radio coordination between access nodes.

The deployment of a bandwidth broker server within each radio access network has been proposed to improve admission control. The bandwidth broker does not address radio link scheduling and radio service activation. It is also a single point-of-failure and requires additional signaling processing in the radio access network and adds significant delay during admission control and handover decisions.

The radio resources are managed by technologies, protocols, tools or methods often referred as radio admission control (RAC), responsible for mobile subscriber connection handling and radio resource management (RRM), where RRM is responsible for radio bearer traffic scheduling and link adaptation. In LTE networks, the radio resources are managed by distributed radio access nodes like the eNodeBs (eNB) and Home eNodeBs.

The transport network (TN) resources are managed by different technologies, e.g., Internet Protocol (IP), Ethernet, multi-protocol label switching (MPLS), protocols, tools or methods often referred to as data traffic engineering. The main objective of traffic engineering is to achieve the lowest transport cost by finding the best possible placement of the offered data traffic over the transport network topology. The TN resources are managed by TN nodes such as routers and switches, and can be remotely monitored by radio access nodes, such as the eNodeBs.

The radio access nodes, such as the eNodeBs and Home eNodeBs, that are responsible for subscriber connection admission control and radio resource coordination and management are not aware of the actual transport network quality and capacity to each peer (neighbor radio access node or mobile core node (MCN)). The third generation partnership project (3GPP) and Internet engineering task force (IETF) standard specifications do not indicate what resource information should be exchanged between the transport and radio networks and how this information should be exchanged. Radio resources and transport resources are currently optimized and managed separately.

One existing solution is to configure the radio admission control on each radio access node with a set of static parameters best representing the available transport resources. For instance, maximum downlink (DL) bandwidth, maximum downlink delay, maximum uplink (UL) bandwidth and maximum uplink delay parameters can be estimated and configured across a given transport interface capable to reach the appropriate core nodes and neighbor access nodes. When a new GBR bearer is requested or is handed over to a new access node, the requested uplink and downlink guaranteed bit rates in bits per second can be compared against the remaining bandwidth in each pool to determine if the bearer should be accepted or rejected. This method has serious limitations. It is difficult to configure and optimize and, does not generate satisfactory results since the resource parameters are static and do not necessarily reflect the actual available bandwidth capacity or actual delay/loss characteristics at a given instant in time.

Another existing solution is to react and manage the congestion across the mobile transport network by configuring differentiated services code point (DSCP)/p-bit marking, classification and class-based traffic management. This solution is designed to protect the high priority traffic against link congestion caused by low priority traffic. This method has serious limitations, as the method does not prevent congestion that can occur for the high priority traffic and queue management techniques, including random early detection (RED). The method also does not provide equal or specific drop probability for subscribers sharing the same low priority class, since the transport nodes cannot distinguish the individual general packet radio service (GPRS) tunneling protocol-user (GTP-U) tunnels or subscriber connections.

Another existing solution is to react and manage the congestion across the mobile transport network by carrying congestion signals or explicit congestion notification (ECN) markings back to the transport sender where the sender is expected to reduce its rate in response. Such mechanisms and protocols are discussed in the Internet engineering task force (IETF) congestion exposure (CONEX) working group. The IETF community is currently working on the problem statement and has not reached consensus on the preferred method for handling transport congestion and how this congestion indication can be delivered to the sender of the traffic. One serious limitation of the CONEX protocol is that all devices and nodes, including the user equipment, may need to be CONEX-enabled to work effectively. Another limitation is that the CONEX protocol does not actually measure the transport network quality or capacity, but instead, reacts to link congestion along the path.

Another existing solution is to introduce a bandwidth broker server within each radio access network, where the broker is responsible for collecting and correlating the load status on all paths in the radio access network and to accept/deny each subscriber connection request when a path across the transport network is congested. This method also has serious limitations. It requires deployment and management of additional servers in each radio access network; potentially one set of servers per radio access technology, e.g., evolved universal terrestrial radio access network (E-UTRAN), UTRAN and global system for mobile communication (GSM). The method requires continuous transfer of all path performance information to a centralized server consuming unnecessary transport network resources. The server may not always have the real-time state of the network, causing inaccurate decisions. Fundamental changes to the signaling architecture is required when a bandwidth broker is introduced, requiring a new bandwidth broker client or radio network server. This would add significant delay of up to 50 ms during admission control and handover decisions, while it is desirable to make such decision in 1 ms or less for X2-based handovers between eNodeBs. The method to measure the load on each hop is not easily deployable if each node along the path is involved in the measurement process by: updating the probe packet, and creating protocol dependencies between the transport network nodes and the endpoint nodes responsible to inject or reflect the test traffic.

SUMMARY

Methods and systems for determining quality and capacity of a transport monitoring connection between a first radio service node and a second radio service node, to facilitate local management of subscriber connections, are disclosed. According to one aspect, the invention provides a method that includes sending first test packets from the first radio service node to the second radio service node via the transport monitoring connection. Second test packets are received from the second radio service node via the transport monitoring connection. The second test packets have information added to the first test packets by the second radio service node. The method includes analyzing at the first radio service node the second test packets to determine a quality and a bandwidth of the transport monitoring connection. Control and user plane functions are informed when transport monitoring performance is one of degraded and improved based on the quality and bandwidth. The method includes making radio service provisioning decisions via the control plane (CP) function and user plane function based on the quality and bandwidth of the transport monitoring connection.

According to this aspect, in some embodiments, the first radio service node is a radio access node and the second radio service node is a radio core node. In some embodiments, the transport monitoring connection is a bidirectional transport monitoring connection between the first radio service node and the second radio service node. In some embodiments, making radio service provisioning decisions includes one of admission and denial of access of a subscriber to a radio network. In some embodiments, making radio service provisioning decisions includes negotiating subscriber bearer rates. In some embodiments, making radio service provisioning decisions includes one of activating and deactivating a radio feature. One of activating and deactivating a radio feature may include one of enabling and disabling carrier aggregation and mobility management for a subscriber. In some embodiments, making radio service provisioning decisions includes modifying a scheduling of at least one bearer packet to at least one subscriber based on the quality and bandwidth of the transport monitoring connection. In some embodiments, making a radio provisioning decision includes sending a congestion notification to at least one of a radio core node and the Internet for at least one subscriber based on the quality and bandwidth of the transport monitoring connection. In these embodiments, the method may further comprise modifying a schedule of at least one bearer packet to the at least one subscriber based on the congestion notification. Some embodiments may further include determining at the first radio service node whether to one of mark user packets with a congestion indication and modify a quality of service based on transport monitoring connection quality and bandwidth. In some embodiments, the first test packets have forward sequence numbers and time of departure stamps, and the second test packets have forward and reverse sequence numbers, time of arrival stamps and time of departure stamps. In some embodiments, the first and second test packets are one of Internet protocol, IP, multiprotocol label switching, MPLS, and Ethernet test packets. In some embodiments, the first radio service node is an evolved node B, eNB, and the second radio service node is a serving gateway, SGW.

According to another aspect, the invention provides a method of monitoring performance of a transport monitoring connection connecting a first radio service node and a second radio service node. The method includes sending outgoing packets to the second radio service node via the transport monitoring connection. The method further includes receiving incoming packets from the second radio service node via the transport monitoring connection, where each incoming packet is received in response to the transmission of an outgoing packet. The incoming packets are processed to determine performance metrics for the transport network. The method further includes verifying, via a control plane entity, a state of the transport network connection based on the performance metrics before one of admitting a subscriber connection and activating a radio feature is performed by the first radio service node. The method further includes informing, via a user plane entity, a radio link scheduler of a state of the transport monitoring connection based on the performance metrics before a scheduling of at least one bearer packet to at least one subscriber is performed by the radio link scheduler.

According to this aspect, in some embodiments, determining the performance metrics include determining at least one of a one-way packet delay, a one-way packet delay variation, a one-way packet loss ratio and a one-way available bandwidth. In some embodiments, determining the performance metrics include determining an average of at least one performance metric over a time interval. Some embodiments may further include making packet discard decisions based on one of the determined performance metrics. Some embodiments may further include performing one of admitting a subscriber connection and activating a radio feature based on the determined state of the transport monitoring connection. Some embodiments may further include scheduling a bearer packet for a user equipment based on the determined state of the transport monitoring connection.

According to yet another aspect, the invention provides a first radio service node having a capacity to monitor performance of a transport network connecting the first radio service node to a second radio service node. The first radio service node includes a transport monitoring controller, TMC, a control plane transport entity and a user plane transport entity. The TMC is configured to: send outgoing packets to the second radio service node via the transport network; receive incoming packets from the second radio service node via the transport network, each incoming packet being received in response to the transmission of an outgoing packet; and process the incoming packets to determine performance metrics for the transport network. The control plane entity is configured to facilitate verification of a state of a transport network connection based on the performance metrics before one of admitting a subscriber connection and activating a radio feature is performed by the first radio service node. The user plane entity is configured to facilitate informing a radio link scheduler of a state of the transport network connection based on the performance metrics before scheduling at least one link to at least one subscriber is performed by the radio link scheduler of the first service network node.

According to this aspect, in some embodiments, the determined performance metrics include at least one of a packet loss ratio, a packet delay, and a transport network connection bandwidth. In some embodiments, the second radio service node is a radio core node. In some embodiments, the TMC is further configured to trigger an alarm to a management system when at least one of a quality and capacity of the transport network is such as to one of block access to a subscriber connection and deny usage of a radio feature.

DETAILED DESCRIPTION

Before describing in detail exemplary embodiments that are in accordance with the present invention, it is noted that the embodiments reside primarily in combinations of apparatus components and processing steps related to determining quality and bandwidth of a transport monitoring connection between radio service nodes, to facilitate local management of subscriber connections. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments described herein illustrate a method and node for determining remote path performance quality and capacity of a radio access node for local management of subscriber connection admission control, user packet scheduling and radio feature activation. A control and user plane connection between the radio access nodes and mobile core nodes is first set-up. Then, a bidirectional transport monitoring connection is set-up as a logical overlay between a set of radio access nodes and mobile core nodes. At each radio access node, test packets reflected by remote peers are analyzed to collect and calculate transport network quality and capacity. A determination is then made at each radio access node whether to accept, deny, or negotiate subscriber bearers and whether to activate or deactivate radio features with the remote peers and further schedule, discard or mark user packets based on transport network quality and capacity.

The following acronyms may be used herein:
BB Bottleneck Bandwidth
CAP WAP Control and Provisioning of Wireless Access Points
CONEX Congestion Exposure
CP Control Plane
DL Downlink
eNB E-UTRAN Node B
E-RAB E-UTRAN Radio Access Bearer
E-UTRAN Evolved Universal Terrestrial Radio Access Network
ECN Explicit Congestion Notification
DSCP Differentiated Services Code Point
FAP Femto Access Point
GBR Guaranteed Bit Rate
GTP GPRS Tunneling Protocol
GTP-U GTP User
HeNB Home E-UTRAN Node B
HeNB GW Home eNB Gateway
IP Internet Protocol
LTE Long Term Evolution
MME Mobility Management Entity
MCN Mobile Core Node
MPLS Multiprotocol Label Switching
PCP Priority Codepoint
PGW Packet Gateway
RAN Radio Access Node
RED Random Early Detection
RN Relay Node
RNC Radio Network Controller
QOS Quality of Service
QCI Quality of Service Class Identifier
RAC Radio Access Control
RAN Radio Access Node
RRM Radio Resource Management
SGSN Serving GPRS Support Node
SGW Serving Gateway TN Transport Network
TM Transport Monitoring
TMC Transport Monitoring Controller
TMR Transport Monitoring Responder
TWAMP Two-Way Active Measurement Protocol
UL Uplink
WAP Wireless (Wi-Fi) Access Point A method for each radio service node to independently and transparently estimate the transport network quality and capacity to each remote peer without involving a bandwidth broker and without involving the transport network equipment in the processing of the test traffic is described herein. The remote peer can be another radio access node or a mobile core node. Herein, the term "radio service node" refers to a radio access node or a radio core node. An example of a radio access node is an eNB. An example of a radio core node is a mobile core node, such as a serving gateway (SGW) or mobile management entity (MME).

Each radio service node may inject IPv4, IPv6, MPLS and/or Ethernet test traffic over the mobile transport network destined to each remote peer. The test traffic is forwarded by intermediate routers, switches and multiplexers without the need for any special packet processing by such transport nodes. The remote peer processes the test traffic and reflects the probe packets back to the source radio service node. The term "reflect" means that the remote peer adds information to the received packets and transmits packets containing the received information and the added information. Each radio service node independently collects the performance measurement data and calculates the transport network (TN) quality and capacity separately for the uplink and downlink transmission direction.

The quality of a transport network is mainly quantified by its packet delay, e.g., in microseconds, and packet loss, e.g., ratio of lost packets over transmitted packets. The capacity of a transport network or a connection/path over a transport network is mainly quantified by its available bandwidth capacity, typically in bits per second. The quality and capacity of a transport network are not mutually exclusive. The lack of capacity on a given path can also impact the loss and delay performance.

Such quality and capacity information can be used locally by a radio access node for subscriber connection admission control, user packet scheduling including transmission control protocol (TCP) optimization and radio feature activation without adding any significant delay or making any changes to the mobile signaling architecture.

Figure 1:
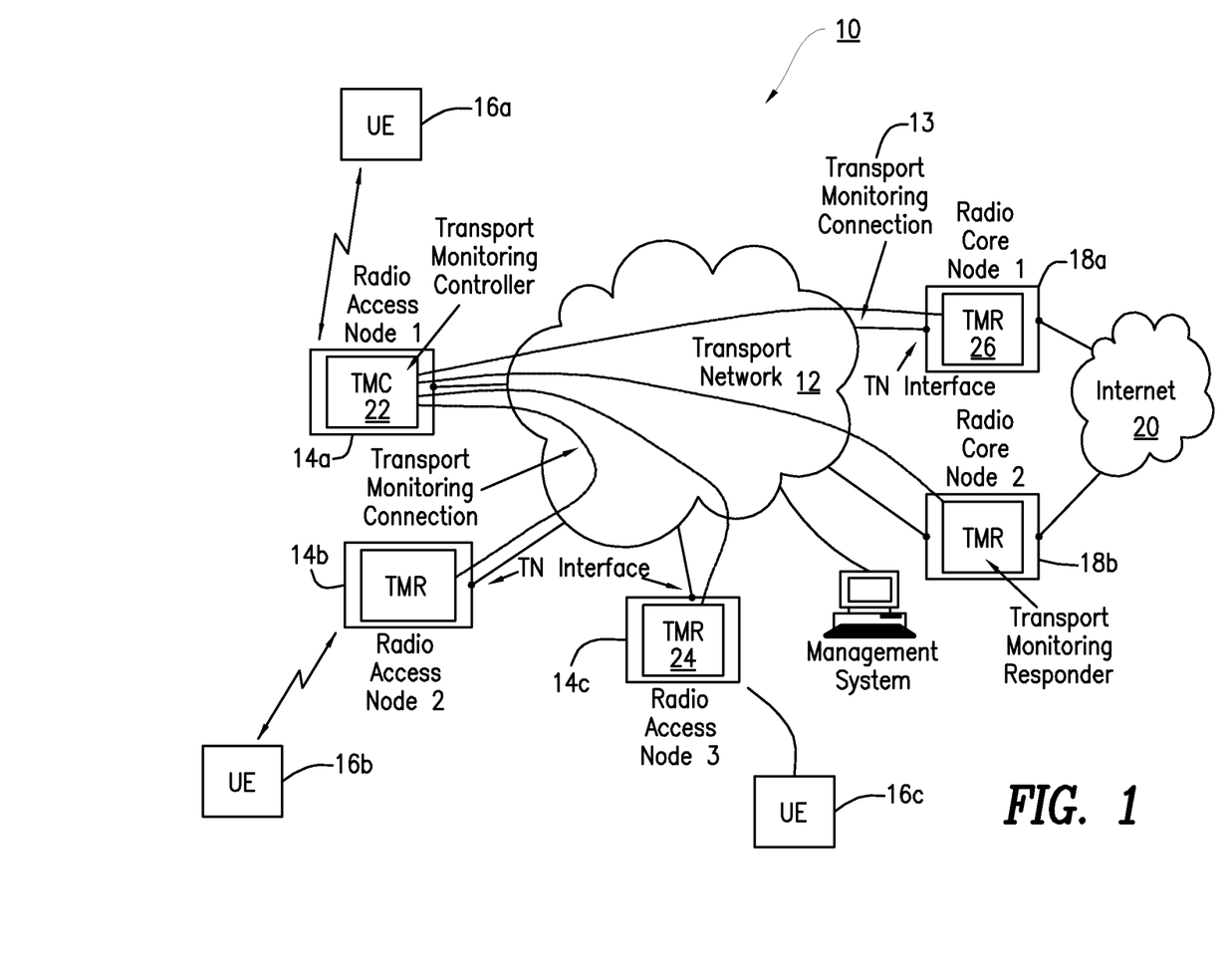
FIG. 1 is a diagram of an exemplary communication network having transport monitoring connections between radio service nodes across a transport network constructed in accordance with principles of the present invention.

Referring now to the drawing figures, in which like reference designators denote like components, there is shown in FIG. 1 a communication network 10 that includes a transport network 12, the performance of which is to be monitored. A plurality of radio access nodes, 14a, 14b and 14c, referred to herein collectively as radio access nodes 14, provide access to the transport network 12 to user equipment 16a, 16b and 16c, referred to herein collectively as user equipment (UE) 16. It will be understood that more or less radio access nodes 14 may be deployed in a given communication network 10, and that each radio access node 14 may serve a plurality of user equipment 16. A radio access node 14 may be a wireless access point (WAP), a femto access point (FAP), a radio node (RN) an eNB, an HeNB or a nodeB. The radio access nodes 14 provide one or more radio interfaces towards the UEs 16 and one or more transport network (TN) interfaces towards the transport network 12. A TN interface can be a wireless interface, an IPv4 interface, an IPv6 interface, an Ethernet interface or any other layer 2 interface.

The communication network 10 also includes radio core nodes 18a and 18b, referred to herein collectively as radio core nodes 18. A radio core node 18 may be a mobile core node such as an HeNB gateway (GW), and FAP gateway, a radio network controller (RNC), a serving general packet radio service (GPRS) support node (SGSN), a gateway GPRS support node (GGSN), a serving gateway (SGW), a public data network gateway (PGW) or a mobile management entity (MME). The radio core nodes 18 provide one or more TN interfaces towards the transport network 12. The radio core nodes 18 may also support other interfaces including interfaces towards the Internet 20.

The connectivity between the radio communication areas (the radio access nodes 14) and the core network (radio core nodes 18) is the transport network 12. The transport network (TN) 12 can include of multiple networks such as the last-mile connection, the backhaul aggregation network and the core network. It can also be a mix of microwave, 3G, 4G, Wi-Fi, fiber and/or copper links operating at different speeds and supporting a mix of Internet Protocol (IP) and/or Ethernet technologies. As an example, a transport monitoring connection 13 connects radio access node 14a to a radio core node 18a. Other transport monitoring connections may be setup to connect various radio service nodes.

The transport network 12 carries the control and user plane connections and associated traffic between the radio access nodes 14 and radio core nodes 18. Such connections can be the CAPWAP, Iub, Iuh, S1, X2 interfaces or any other type of control or user plane connections. An example of user plane connections are GPRS tunneling protocol-user (GTP-U) tunnels.

The TN interfaces of the radio access nodes 14 and the radio core nodes 18 are configured with an active measurement function and protocol arranged to measure the quality and capacity of the transport network 12. The transport monitoring architecture is comprised of a radio access node 14a acting as a transport monitoring controller (TMC) 22, radio access nodes 14b and 14c, each acting as a transport monitoring responder (TMR) 24, and radio core nodes 18a and 18b, each acting as a transport monitoring responder (TMR) 26.

The TMC 22 initiates one or more test connections and injects test packets into the transport network 12. The test packets are IP, multi-protocol label switching (MPLS) or Ethernet test packets. Each test connection (and associated test packets) is configured with a specific quality of service (QoS) marking, such as the Differentiated Services Code Point (DSCP) or Priority Codepoint (PCP), and a specific packet size. Each TMR 24, 26 listens for incoming test packets and transmits a test packet to the TMC 22 in response to each test packet it receives.

A TMR 24, 26 can participate in several active test connections at the same time with the same TMC 22 or with different TMCs. Packets originating from a test connection on the TMC 22 are time stamped with a first time stamp, tagged with forward direction sequence numbers and transmitted to a TMR 24, 26. The TMR 24, 26 applies a second time stamp to the incoming packets, creates new test packets (one packet is created for each test packet received) and sends the new test packets to the TMC 22 as soon as possible or may buffer the new test packets if there is an indication in the test packet that the test packet belongs to a test packet train. The reflected test packets are time stamped with a third time stamp and tagged with reverse direction sequence numbers. The TMC 22 generates a fourth timestamp for each packet the TMC 22 receives from the TMR 24, 26.

Using the set of four timestamps and the pair of sequence numbers for each test packet, the TMC 22 can calculate various one-way path metrics for each transport monitoring connection in both the forward and the reverse directions. Examples of one-way path metrics include one-way packet delay and packet loss as well as the one-way available path capacity. The TMR 24, 26 does not calculate performance metrics but simply act as an echo function. This is known as a two-way round-trip measurement architecture. The IETF IP Performance Metrics (IPPM) working group has defined the Two-Way Active Measurement Protocol (TWAMP) designed for round-trip measurements. TWAMP is capable to measure the one-way packet delay and packet loss between two hosts as well as the one-way available path capacity.

Figure 2:
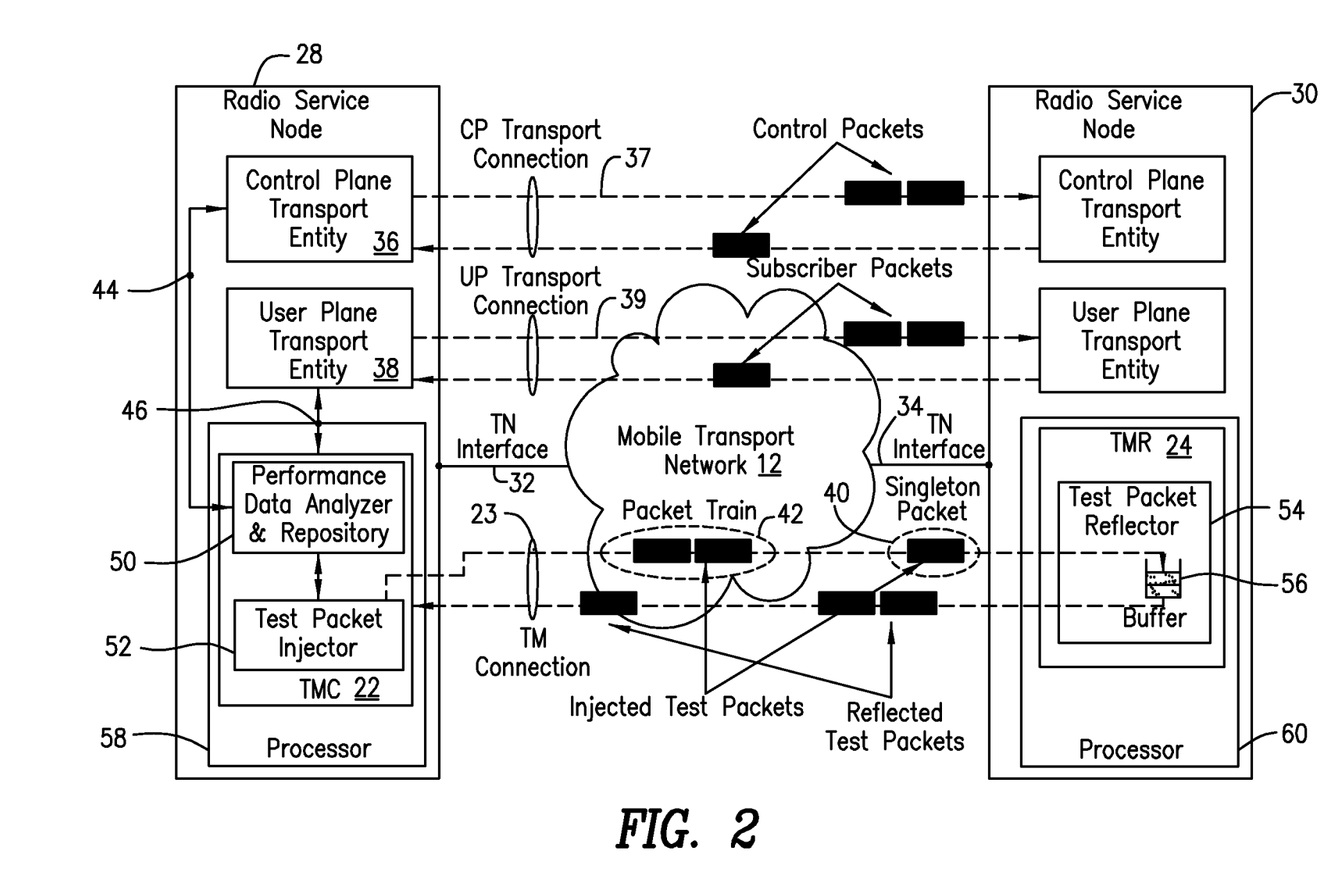
FIG. 2 is a diagram of two radio service nodes in communication across a transport network capable of monitoring a transport network connection constructed in accordance with principles of the present invention.

FIG. 2 is a block diagram of two radio service nodes, 28 and 30, that exchange test packets between them. The radio service nodes 28 and 30 may be two radio access nodes or a radio access node and radio core node. The test packets may be exchanged using the same pair of transport network (TN) interfaces 32, 34 responsible for terminating/originating the transport user plane and control plane traffic. Thus, each radio service node has a control plane transport entity 36 for exchanging control packets and a user plane transport entity 38 for exchanging subscriber packets. Also, the control plane entity 36 may verify a state of the transport network connection 13 based on performance metrics before one of admitting a subscriber connection and activating a radio feature is performed by the radio service node 28. The user plane entity 38 may inform a radio link scheduler (not shown) of a state of the transport monitoring connection based on performance metrics before scheduling of a least one bearer packet to at least one subscriber is performed by the radio link scheduler. For convenience, the control plane entity 36 and the user plane entity 38 are shown connected by a control plane transport connection 37 and user plane transport connection 39, respectively, which connections may be facilitated via the transport network interfaces 32 and 34. Similarly, the TMC 22 and the TMR 24 are shown connected by a transport monitoring connection 23 that may be facilitated via the transport network interfaces 32 and 34. The packets of the transport network monitoring traffic are configured with the same QoS marking as the user plane or control plane traffic to ensure the test traffic receives the same QoS treatment as the control or user plane traffic.

The test packets for a given transport monitoring connection are transmitted as single test packets 40, groups of test packets called packet trains 42, or as a mix of packet trains interleaved with single test packets. Packet trains measure the available capacity and the packet delay and packet loss performance. Single test packets measure the packet delay and loss performance. Thus, the TMC 22 may include a performance analyzer and repository 50 to analyze and store the information in the packets to determine the one-way performance metrics, and a test packet injector 52 to inject test packets onto the monitoring connection, implemented by a processor 58 and associated memory. The TMR 24 may include a test packet reflector 54 and buffer 56 implemented by a processor 60 and associated memory. The test packet reflector 54 adds the new time stamps and sequence number to a packet and sends the packet with new information back to the TMC 22. The buffer 56 stores packets to be reflected in the event that a train of packets or multiple single test packets are being received by the TMR 24.

The TMC 22 injects test traffic, and computes and collects the test performance metrics based on the test packets reflected by the TMR 24. The performance of each transport monitoring connection is described with a set of performance metrics. The performance metrics can be one or more of the following performance data:

Transmit one-way packet delay;
Receive one-way packet delay;
Transmit one-way packet delay variation;
Receive one-way packet delay variation;
Ratio of lost transmit packets during a measurement interval;
Ratio of lost receive packets during a measurement interval;
Transmit available bandwidth capacity; and
Receive available bandwidth capacity.

The TMC 22 may estimate the available transport network capacity using a mathematical algorithm or filter-based approach such as the Bandwidth Available in Real Time (BART) method. The available transport network capacity may be translated to available subscriber capacity in order to simplify the radio admission control decision based on subscriber-layer parameters like the GBR and AMBR. The available subscriber capacity over the transport network may not account for the subscriber transport overhead such as GTP-U tunneling overhead. One exemplary method to determine the transport overhead is to calculate the aggregated overhead from the GTP-U/UDP/IP headers based on the number of GTP-U packets and octets being transmitted and received at a given time, and removing the bandwidth overhead from the available transport network capacity measurement.

The performance metrics stored on each radio service node can be the last measured value, the running average over a subset of values, a user configurable percentile over a subset of values or the maximum/minimum value over a subset of values. For instance, a test connection can be configured to measure the available capacity every second. The reported/stored value can be the available capacity measured in the last second, the running average calculated over a configurable period (say the last 10 seconds), the 75th percentile calculated over a configurable period or the minimum available capacity calculated over a configurable period.

FIG. 2 also shows an interface 44 between the control plane entity 36 and the TMC 22, and an interface 46 between the user plane entity 38 and the TMC 22. The interface 44 enables the control plane functions, such as radio access control (RAC), to verify the state of the transport network to a specific remote peer before admitting a subscriber connection or activating a radio feature. The interface 46 enables the TMC 22 to inform the user plane functions, such as the radio link schedulers, of high/normal TN utilization or performance degradation or improvement from a specific remote peer.

Active queue management functions located in the user plane entity 38 directed toward the UEs 16 or toward the transport network 12, can be activated to drop or mark packets (ECN or DSCP marking) in an attempt to provide equal or specific drop probability for subscribers sharing the same congested path and priority class. Queue management techniques are known in the art and are beyond the scope of the invention, and are therefore not described herein. The radio access node 14 may also trigger an alarm or notification towards a management system via a radio core node 18 when the quality and/or capacity of the transport network is blocking access to one or more subscriber connections or does not permit the usage of a radio feature.

Figure 3:
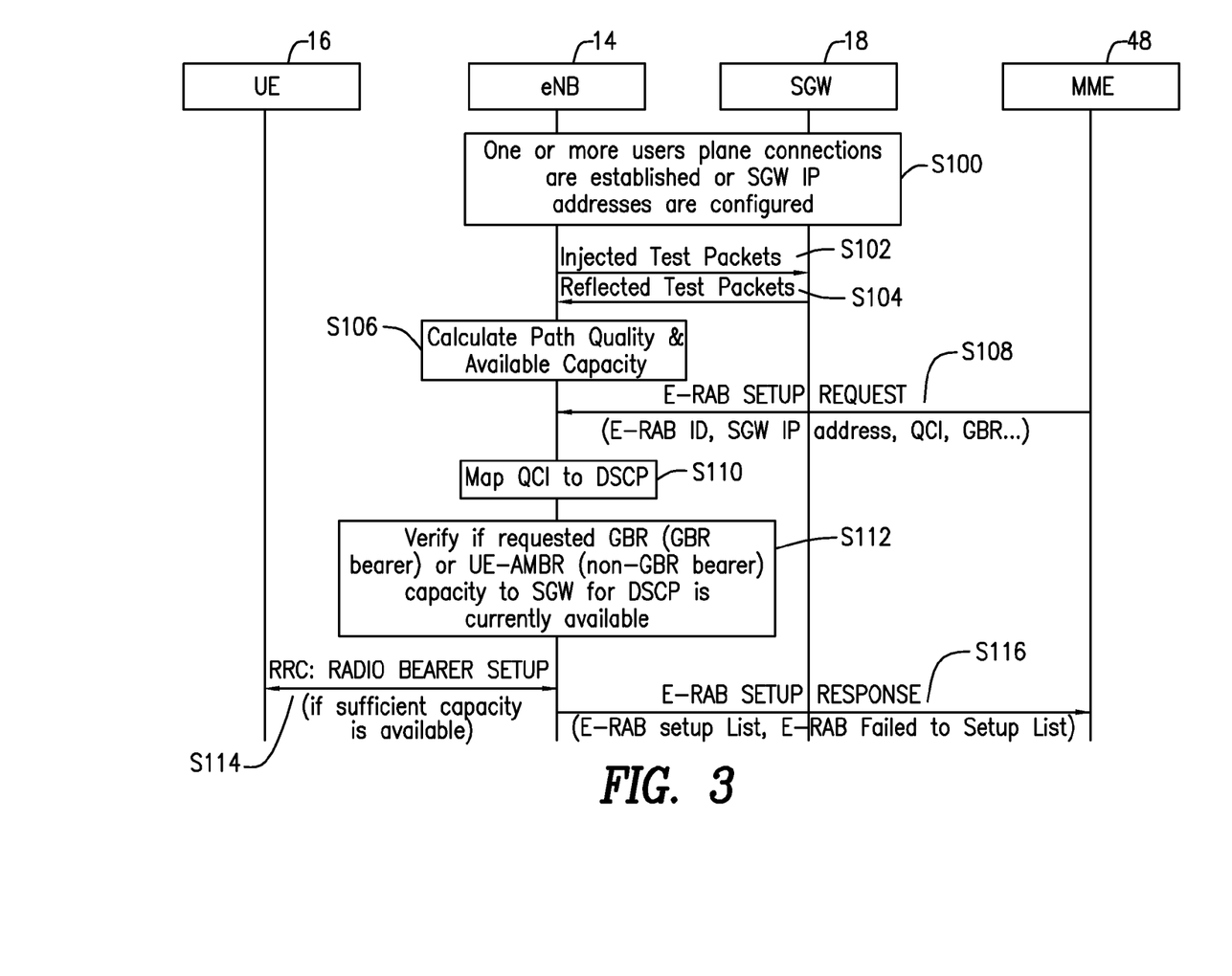
FIG. 3 is a diagram of an exemplary process for setting up and monitoring a transport network connection and making a radio service provisioning decision according to principles of the present invention.

An exemplary sequence of events for exchange of test packets and for making radio service provisioning decisions based on analysis of information of the test packets is described with reference to FIG. 3. In a first step (S100), one or more user plane connections are established between a radio access node 14 such as an eNB and a radio core node 18, such as an SGW. Alternatively, SGW IP addresses may be configured by the radio core node 18 and made known to the radio access node 14. Next, the radio access node 14 injects test packets onto the transport network toward the radio core node 18 (S102). In response, the radio core node 18 transmits reflected test packets back toward the radio access node 14 (S104). Based on information in the reflected test packets, the radio access node 14 calculates path quality and available capacity (S106) using known techniques. In another step or series of steps an E-RAB setup request from an MME 48 is sent to the radio access node 14 (S108). The purpose of the E-RAB setup procedure is to assign resources on the radio and S1 interfaces for one of several radio bearers and associated GTP-U tunnels for a given UE. Based on the request, the radio access node 14 maps a QCI to a DSCP (S110). The QCCI is a number that is associated with each radio bearer and is used as a reference to control bearer level packet forwarding treatment. The radio access node 14 also verifies if a requested GBR or UE-AMBR (for a non GBR bearer) capacity is available from the transport network 12 connecting the radio access network 14 and radio core node 18 (S112). The radio access node 14 then sends a radio bearer setup signal to the UE 16 (S114), and further sends an E-RAB setup response to the MME 48 (S116) to accept or deny the establishment of a radio bearer and associated GTP-U tunnel for the requested bandwidth.

Figure 4:
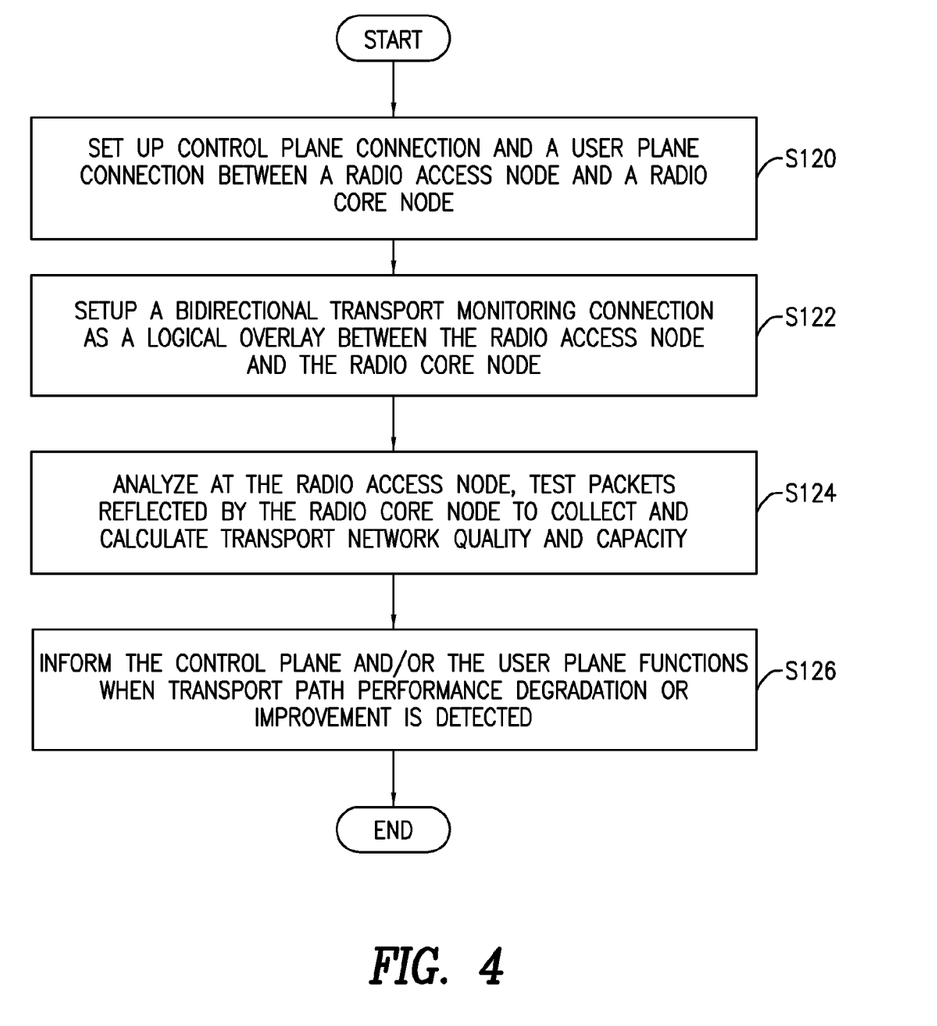
FIG. 4 is a flowchart of an exemplary process for setting up and monitoring a transport monitoring connection and analyzing data to determine a quality and capacity of the transport monitoring connection.

An exemplary process for setting up and monitoring a transport network connection between a radio access node 14 and a radio core node 18 is described with reference to FIG. 4. The same process applies to setting up and monitoring a transport network connection between any two radio service nodes. In a first step, a network operator will setup a control plane connection and a user plane connection between a radio access node 14 and a radio core node 18 (S120). Next, the operator may setup a bidirectional transport monitoring connection as a logical overlay between the radio access node 14 and the radio core node 18 (S122). As used herein, logical overlay means that the transport monitoring connection is set up with the same IP addresses and DSCP as the user plane transport connection. Steps S120 and S122 may be performed manually or automatically. Test packets reflected by the radio core node 18 are analyzed at the radio access node 14 to collect and calculate transport network quality and capacity (S124). The control plane and/or the user plane functions of the radio access node 14 are informed when transport connection path performance improvement or degradation is detected (S126), where performance improvement or degradation detection may be based on the one-way performance metrics described above, i.e., packet loss, packet loss variation, and connection capacity.

Figure 5:
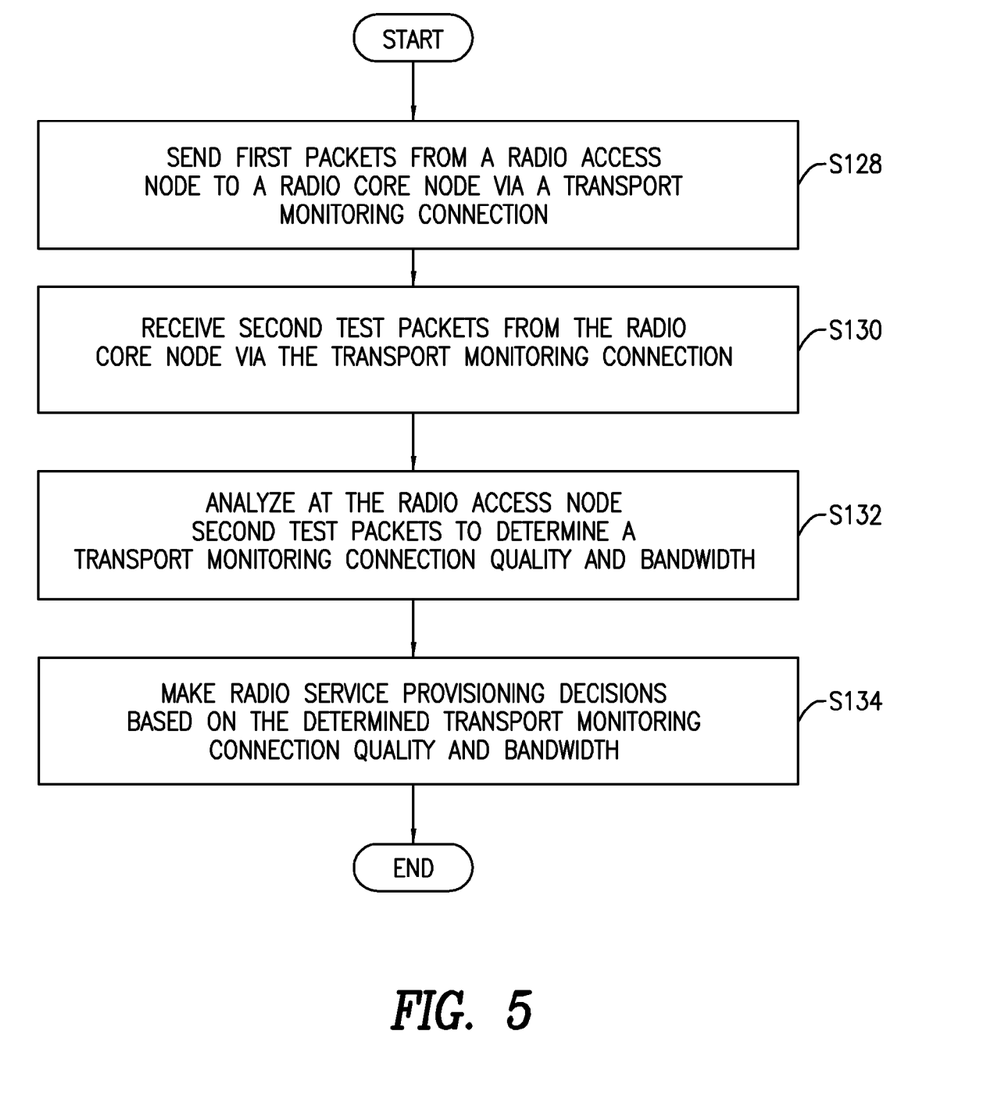
FIG. 5 is a flowchart of an exemplary process for exchanging packets, analyzing packets to determine quality and bandwidth of a transport monitoring connection, and making radio service provisioning decisions based on the determined quality and bandwidth.

FIG. 5 is a flowchart of an exemplary process for monitoring a transport network connection and making radio service provisioning decisions based on transport network performance. First packets are sent from a radio access node 14 to a radio core node 18 via a transport monitoring connection 13 (S128). Second test packets are received from the radio core node 18 via the transport monitoring connection 13 (S130). The second test packets are in response to the first packets received at the radio core network 18 from the radio access node 14. The second test packets contain the information of the first test packets plus additional information added by the radio core node 18, as discussed above, i.e., arrival and departure time stamps and sequence number. This process is referred to herein as "reflecting" the first packets to produce the second packets. The radio access node 14 analyzes the second test packets to determine a transport monitoring connection 13 quality and bandwidth (S132). Radio service provisioning decisions are made based on the determined transport monitoring connection 13 quality and bandwidth (S134). Radio service provisioning decisions may include one or more of admission/denial of access of a subscriber to the radio network, negotiating subscriber bearer rates, activating/deactivating a radio feature (which may include one of enabling and disabling carrier aggregation and mobility management for a subscriber), and modifying a scheduling of at least one bearer packet to at least one subscriber. The process of FIG. 5 may, in some embodiments, include determining at the first radio service node whether to one of mark user packets with a congestion indication and modify a quality of service based on transport monitoring connection quality and bandwidth.

Figure 6:
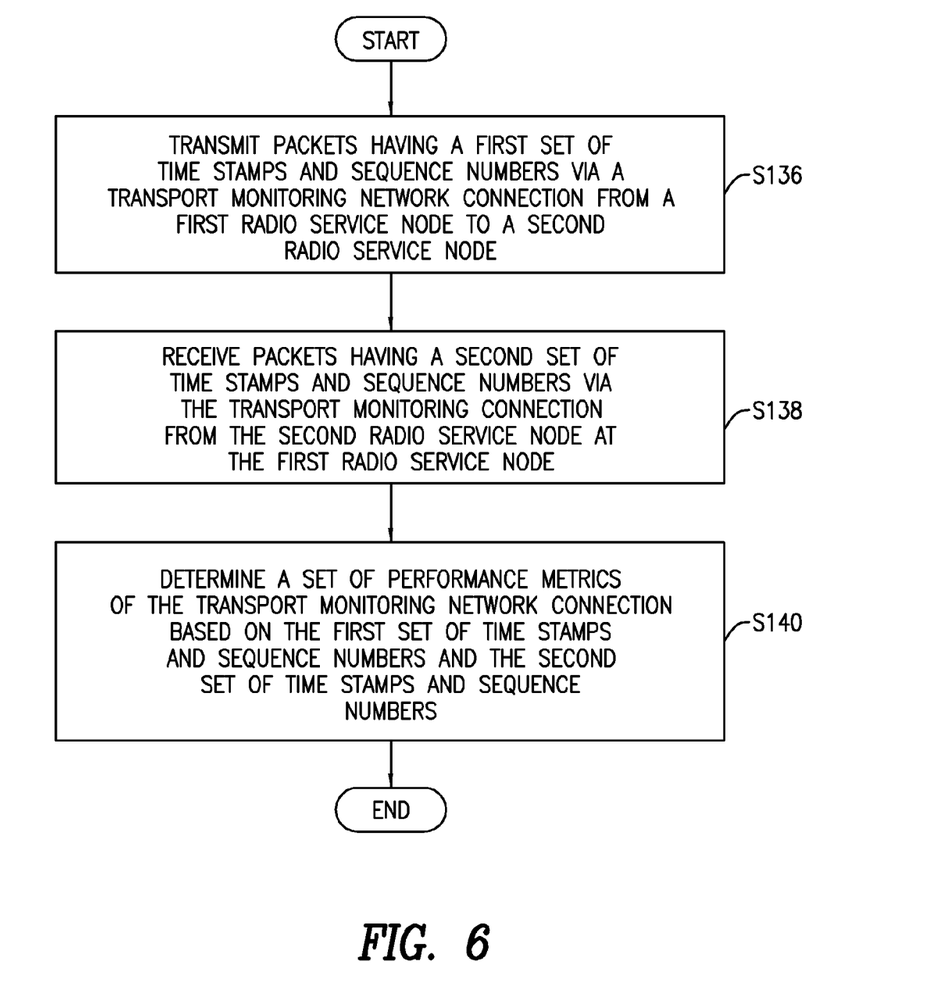
FIG. 6 is a flowchart of an exemplary process for exchanging packets and determining a set of performance metrics of a transport monitoring connection based on information in the packets.

FIG. 6 is a flowchart of an exemplary process for exchanging test packets to produce information from which performance metrics can be derived. A first radio service node 28 having a transmit monitoring collector 22, transmits packets having a first set of time stamps and sequence numbers via a transport monitoring connection 13 to a second radio service node 30 (S136). A second set of packets having a second set of time stamps and sequence numbers is received at the first radio service node 28 via the transport monitoring connection 13 from the second radio service node 30 (S138). The first radio service node 28 determines a set of performance metrics of the transport monitoring connection 13, based on the first set of time stamps and sequence numbers and the second set of time stamps and sequence numbers (S140). The performance metrics may include at least one of a one-way packet delay, a one-way packet delay variation, a one-way packet loss ratio, and a one-way available bandwidth. An average of at least one performance over a time interval may be computed, for example. A packet discard decision may be based on at least one performance metric. Based on the determined state of the transport monitoring connection a subscriber may be admitted or a radio feature may be activated or a bearer packet for a user equipment may be scheduled.

Embodiments offer a scalable distributed solution to a problem of monitoring transport network connections, where the burden of the performance monitoring tasks are distributed over a large number of remote access nodes. Performance of a transport monitoring connection may be transparently measured from any radio service node without the need to deploy a new protocol within the transport network. Test protocol coordination is only needed between the radio service nodes (radio access nodes and mobile core nodes). Coordination between the radio access node and the transport nodes, such as intermediate IP routers and Ethernet or MPLS switches, is not needed.

Similarly, there is no need to change the user plane or control plane (signaling) protocol or architecture and no need to deploy or manage any additional equipment like a bandwidth broker. There is no significant delay during admission control or handover since the decision is made locally by the radio access node based on performance data collected and computed locally by the radio access node. The present solution allows radio access nodes to protect currently established subscriber connections, to use intelligent subscriber packet discard or marking for improving fairness among subscribers, to make better decisions concerning radio feature activation and new subscriber connection and traffic handling and, to account for all resource bottlenecks up to the Internet peering point, including performance degradation across the transport network.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of monitoring performance of a transport monitoring connection connecting a first radio service node and a second radio service node, the method comprising:
    sending outgoing packets to the second radio service node via the transport monitoring connection, the outgoing packets including forward sequence numbers;
    receiving incoming packets from the second radio service node via the transport monitoring connection, each incoming packet received in response to the transmission of at least one outgoing packet, the incoming packets including reverse sequence numbers, the reverse sequence numbers being a different sequence from the forward sequence numbers;
    processing the incoming packets to determine performance metrics for the transport monitoring connection, the processing including processing the forward and reverse sequence numbers to determine a packet loss ratio in a forward direction and a reverse direction;
    verifying, via a control plane entity, a state of the transport monitoring connection based on the performance metrics before one of admitting a subscriber connection and activating a radio feature is performed by the first radio service node; and
    informing, via a user plane entity, a radio link scheduler of a state of the transport monitoring connection based on the performance metrics before a scheduling of at least one bearer packet to at least one subscriber is performed by the radio link scheduler.

2. The method of claim 1, wherein determining the performance metrics include determining at least one of a one-way packet delay, a one-way packet delay variation, a one-way packet loss ratio and a one-way available bandwidth.

3. The method of claim 1, wherein determining the performance metrics include determining an average of at least one performance metric over a time interval.

4. The method of claim 1, further comprising making packet discard decisions based on one of the determined performance metrics.

5. The method of claim 1, further comprising performing one of admitting a subscriber connection and activating a radio feature based on the determined state of the transport monitoring connection.

6. The method of claim 1, further comprising scheduling a bearer packet for a user equipment based on the determined state of the transport monitoring connection.

7. A first radio service node having a capacity to monitor performance of a transport network connecting the first radio service node to a second radio service node, the first radio service node comprising:
    a transport monitoring controller, TMC, the TMC configured to:
        send outgoing packets to the second radio service node via the transport network, the outgoing packets including forward sequence numbers;
        receive incoming packets from the second radio service node via the transport network, each incoming packet being received in response to the transmission of at least one outgoing packet, the incoming packets including reverse sequence numbers, the reverse sequence numbers being a different sequence from the forward sequence numbers; and
        process the incoming packets to determine performance metrics for the transport network the processing including processing the forward and reverse sequence numbers to determine a packet loss ratio in a forward and a reverse direction; and
    a control plane transport entity configured to:
        receive the performance metrics from the TMC;
        facilitate verification of a state of a transport network connection based on the performance metrics before one of admitting a subscriber connection and activating a radio feature is performed by the first radio service node; and
    a user plane transport entity configured to:
        receive the performance metrics from the TMC;
        facilitate informing a radio link scheduler of a state of the transport network connection based on the performance metrics before scheduling at least one link to at least one subscriber is performed by the radio link scheduler of the first service network node.

8. The first radio service node of claim 7, wherein the determined performance metrics include at least one of a packet loss ratio, a packet delay, and a transport network connection bandwidth.

9. The radio service node of claim 7, wherein the second radio service node is a radio core node.

10. The radio service node of claim 7, wherein the TMC is further configured to trigger an alarm to a management system when at least one of a quality and capacity of the transport network is such as to one of block access to a subscriber connection and deny usage of a radio feature.

* * * * *

UNITED STATES PATENT AND TRADEMARK OFFICE
CERTIFICATE OF CORRECTION

| | | |
|---|---|---|
| PATENT NO. | : 9,326,182 B2 | Page 1 of 1 |
| APPLICATION NO. | : 14/042766 | |
| DATED | : April 26, 2016 | |
| INVENTOR(S) | : Baillargeon | |

It is certified that error appears in the above-identified patent and that said Letters Patent is hereby corrected as shown below:

On the Title Page, in Figure 2, for Tag "40", in Line 1, delete "Singleton" and insert -- Single test --, therefor.

In the Drawings:

In Fig. 2, Sheet 2 of 6, for Tag "40", in Line 1, delete "Singleton" and insert -- Single test --, therefor.

In the Specification:

In Column 6, Line 33, delete "CAP WAP" and insert -- CAPWAP --, therefor.

In Column 11, Line 22, delete "network" and insert -- node --, therefor.

In Column 12, Line 18, delete "collector" and insert -- controller --, therefor.

In the Claims:

In Column 14, Line 53, in Claim 9, delete "The" and insert -- The first --, therefor.

In Column 14, Line 55, in Claim 10, delete "The" and insert -- The first --, therefor.

Signed and Sealed this
Second Day of August, 2016

Michelle K. Lee
*Director of the United States Patent and Trademark Office*